Patented May 8, 1928.

1,668,920

UNITED STATES PATENT OFFICE.

HAROLD T. MAITLAND, OF SHARON HILL, PENNSYLVANIA, ASSIGNOR TO SUN OIL COMPANY, OF PHILADELPHIA, PENNSYLVANIA, A CORPORATION OF NEW JERSEY.

PROCESS OF REFINING MINERAL OIL.

No Drawing. Application filed December 21, 1921. Serial No. 523,996.

My invention has for its object the refining of mineral oil and particularly the refining of the heavier distillates, such as lubricating oil stock, in such manner as to effect a substantial reduction in the cost of manufacture and at the same time produce a product of appreciably higher quality.

The two most ordinarily used processes of refining petroleum oil distillates are, first, successive treatments with sulfuric acid and an alkali, and, second, so-called filtration through fuller's earth, animal charcoal or other media. In the first treatment, the oil and acid are thoroughly mixed by agitation, causing the acid to combine with certain unsaturated hydrocarbons and other compounds, and the combined acid hydrocarbons and compounds are allowed to settle to the bottom of the tank, forming a sludge acid, which is drawn off. After washing with water, an alkali, usually caustic soda, is added to neutralize the acid and thus eliminate it, as fully as possible, from the oil. This process, while generally and successfully used, involves the use of considerable quantities of sulfuric acid (say, in the case of the treatment of lubricating oil stock, about four per cent by volume as much acid as oil, most of which cannot be satisfactorily or economically recovered), which is an item of considerable expense.

The other process involves the so-called filtration of the oil through fuller's earth, animal charcoal or other media. This process, however, is much more expensive than the acid-alkali process, in that a great deal of oil is absorbed by the fuller's earth, which must be subsequently washed out with a solvent and the solvent distilled off, while the fuller's earth must be re-purified. This process is generally assumed to be a filtration process, but experience, observation and experiment have convinced me that with certain media it is largely, if not wholly, a chemical process, due to the reaction between certain coloring matter or impurities of the oil and chemical substances contained in the earth and which are effective because of the great superficial area presented by the particles or grains of the earth, but which chemical substances would be largely ineffective if added in bulk to the oil or possibly unless added in prohibitively large quantities.

Starting with the conclusions which I reached as to the essential character of the so-called filtration through fuller's earth, I have successfully developed a refining process which, in the manner of execution, resembles the so-called filtration process, but in which the principal reagent is preferably (although not necessarily) sulfuric acid, and which is substantially cheaper than either of the prior processes and produces a refined oil of superior quality and appearance.

In describing the present process, I shall not enumerate in detail all the different embodiments of the invention that I have successfully used, but I shall first describe that embodiment of the invention which has yielded the most satisfactory results from the standpoint of efficiency and economy.

I first take sand which has been run through a forty mesh screen, and caught on a sixty mesh screen, thus sifting out the coarse and fine particles, and coat this sand with sulfuric acid. For example, to 500 parts by volume of such sand I add 20 parts by volume of sulfuric acid, and then, by stirring, distribute the acid uniformly throughout the sand. I have discovered that a relatively very small amount of acid may be thus caused to distribute itself over a surprisingly large superficial area so as to render effective every minute particle of acid. The oil stock is then caused to percolate through the sand, as through a filter bed, although the process is not mainly, if at all, one of filtration, the action of the acid being apparently the same as when it is added direct to the oil, as in the usual process. The oil may be run onto the sand bed in a steady stream; or the oil may be added from time to time. I have found that it is possible to treat about 7000 parts by volume of oil stock, before the efficiency of the acid-coated sand begins to be seriously impaired.

The outflowing oil contains but a very small proportion of the sulfuric acid, and practically no resins that result from the acid treatment, most of these remaining in the sand bed. In many cases, the percentage of acid is so minute that there will be very little subsequent darkening or discoloration. But to secure in all cases oil of the best appearance and quality, it is desirable to promptly neutralize the oil with caustic soda or other alkali or to "filter" the oil through fuller's earth or other media. The latter operation is not an expensive one, because the proportion of contaminating material that it is desired to eliminate is so small that the bed of fuller's earth or other media lasts many times as long as if the oil were run through such a bed in the first instance.

The main advantage of the process over the present acid-alkali process is in the very small amount of acid that is required. Ordinarily, in the treatment of lubricating stock, the amount of acid used is about four per cent of the oil treated, whereas in my process the permissible minimum percentage of acid is reduced to less than one third of one per cent. To expedite the process, however, it may be desirable to increase the size of the sand granules (thereby facilitating penetration by the oil but reducing the superficial area of the "base") and to increase the percentage of acid, say up to about one per cent of the oil. Even this percentage of acid is so relatively low as to achieve a pronounced saving over the ordinary process.

I do not herein contemplate the employment of a base so finely divided as to constitute a "powder", as this would seriously obstruct penetration by the oil and make the process extremely slow; while to the extent that the oil would percolate through the bed it would be likely to carry away suspended in it some of the powdered base, the removal of which from the oil would be difficult and expensive, while its retention in the oil would unfit the refined product for lubricating purposes.

A large number of "bases" may be substituted for sand. Another permissible base for the acid is fuller's earth itself, which has the advantage that each particle thereof presents a far more irregular superficial contour, and therefore a surface of greater area, than is presented by a grain of sand. The use of fuller's earth, however, is less economical, both as regards the greater cost of the material and the greater quantity of acid that it absorbs.

The amount of oil that is retained by the sand bed is comparatively small, and the sand bed, with the contained oil and acid, as well as resins, may be absolutely thrown away, and yet the process would be distinctly more economical than the ordinary process of adding the acid direct to the body of oil. It will usually pay, however, to wash out the oil from the sand with naphtha and distill off the naphtha from the oil, in the same manner as is now done to recover oil from fuller's earth.

I have also found that materials, other than sulfuric acid, which are ineffective to attack the objectionable compounds in the unrefined oil is added direct to the body of oil, are more or less effective if added to a base of the character described.

I have taken fuller's earth, reduced it to an impalpable power, saturated it with water to form a paste and coated the base with such paste and found it to give quite satisfactory results; demonstrating, incidentally, that the purifying action of fuller's earth upon oil is largely, if not wholly, a superficial action. I have also found that certain compounds of silicon, such as the different forms of silicic acid, silicon dioxide and both single and double silicates, if added to sand in the form of a coating, will act rather efficiently on the impurities of the oil and hold them in the body of sand. These specified substances are to be understood as equivalents, in my process, for sulfuric acid.

I have also used successfully, as bases, glass beads, spent earth, particles of brick and clay, and other inert substances.

An essential quality of the base is that it shall present a large superficial area.

An important, if not indispensable, quality of the base is that it shall be non-absorbent, or nearly so; that is, that the separate grains or particles shall not be porous. Fuller's earth substantially meets this requirement, as the dissection and microscopic examination of separate grains of a body of such earth through which oil has percolated show that the interior of the grain has not been active. It is preferable, however, to employ as a base a substance which is not only non-absorbent, but which itself is chemically neutral to the impurities of the oil, and which is cheap and readily obtainable.

Having now fully described my invention, what I claim and desire to protect by Letters Patent is:

1. The process of refining mineral oil stock which comprises coating a body of material composed of discrete solid particles presenting a very large superficial area with a thin film of a relatively small amount by volume of sulfuric acid and passing the stock through a quiescent body of said material in contact with said coating, the acid being adapted to react with the impurities of the oil which it is desired to eliminate and hold them in the bed while the oil that has passed through the bed is substantially freed from such impurities and carries down with it but little acid.

2. The process of refining mineral oil stock which comprises taking a body of chemically inert material composed of discrete solid particles presenting a very large superficial area, coating said body of material with a thin film of a relatively small amount by volume of sulfuric acid, and passing the stock through a quiescent body of said material in contact with said coating, the acid being adapted to react with the impurities of the oil which it is desired to eliminate and hold them in the bed while the oil that has passed through the bed is substantially freed from such impurities and carries down with it but little acid.

3. The process of refining mineral oil stock by treatment with sulfuric acid, which comprises coating a base of material composed of discrete solid particles presenting a very large superficial area with sulfuric acid in an amount by volume not over ten per cent of the amount of the base and passing the stock through the base in contact with said coating, the percentage of acid being not over about one per cent of the oil, thereby, by means of a relatively small amount of acid, substantially freeing a relatively large amount of oil of impurities and producing a purified oil containing but little acid.

4. The process of refining mineral oil stock by treatment with sulfuric acid, which comprises coating a body of chemically inert material composed of discrete solid particles presenting a very large superficial area with sulfuric acid in an amount by volume not over ten per cent of the amount of the body of material, and passing the stock through the body of material in contact with said coating, the percentage of acid not being over about one per cent of the oil, thereby enabling a relatively small amount of acid to react with the impurities of the oil which it is desired to eliminate and hold them in the body of material, while the comparatively large amount of oil that has passed through the body of material is substantially freed from such impurities and carries down with it but little acid.

In testimony of which invention, I have hereunto set my hand, at Philadelphia, Penna., on this 19th day of December, 1921.

HAROLD T. MAITLAND.